US008597733B2

(12) United States Patent
Vonfelden

(10) Patent No.: US 8,597,733 B2
(45) Date of Patent: Dec. 3, 2013

(54) METHODS FOR MANUFACTURING RECYCLABLE AND REPULPABLE PACKAGING MATERIALS

(75) Inventor: Robert Scott Vonfelden, Concord, CA (US)

(73) Assignee: Eco-Friendly Solutions, LLC, San Juan Capistrano, CA (US)

( * ) Notice: Subject to any disclaimer, the term of this patent is extended or adjusted under 35 U.S.C. 154(b) by 176 days.

(21) Appl. No.: 13/041,310

(22) Filed: Mar. 4, 2011

(65) Prior Publication Data

US 2011/0244258 A1 Oct. 6, 2011

Related U.S. Application Data

(60) Provisional application No. 61/311,186, filed on Mar. 5, 2010.

(51) Int. Cl.
 *B05D 3/02* (2006.01)
(52) U.S. Cl.
 USPC ............ 427/374.1; 427/384; 427/385.5; 427/389.9; 427/391; 427/392; 427/394; 427/395; 427/396
(58) Field of Classification Search
 None
 See application file for complete search history.

(56) References Cited

U.S. PATENT DOCUMENTS

| | | | |
|---|---|---|---|
| 4,173,669 A | | 11/1979 | Ashida et al. |
| 4,977,191 A | * | 12/1990 | Salsman ............ 521/48 |
| 5,275,846 A | * | 1/1994 | Imai et al. ............ 427/362 |
| 5,958,601 A | * | 9/1999 | Salsman ............ 428/480 |
| 6,951,962 B2 | | 10/2005 | Bottorff |
| 2004/0131871 A1 | | 7/2004 | Lee et al. |
| 2004/0241475 A1 | | 12/2004 | Morabito |
| 2009/0239057 A1 | | 9/2009 | Quintens et al. |

OTHER PUBLICATIONS

International Search Report mailed May 9, 2011, for PCT Application No. PCT/US11/27310, filed Mar. 4, 2011, three pages.

* cited by examiner

*Primary Examiner* — Erma Cameron
(74) *Attorney, Agent, or Firm* — Morrison & Foerster LLP

(57) ABSTRACT

Polymeric formulations which contain aqueous dispersions of acrylic monomers and copolymers and modified polyethylene terephthalate resin are disclosed which are useful as a coating system or treatment for imparting water, oil and grease resistance to underlying cellulosic substrates. The formulations do not contain any fluorochemicals, polyethylene or wax. Moreover, the formulations provide water, oil and grease resistance properties that are an improvement in the art to known coatings and treatments which contain polyethylene and or wax for water, oil and grease resistance. These coatings can also impart improved anti-wicking properties over the existing art. These formulations have interest as they contain components that are permitted to come into direct contact with food products. Therefore, the formulations of the present invention are ideal for use as coatings for paper and paperboard, including paper packaging such as that utilized in food wrappers, food containers, food receptacles, etc. In addition, because these formulations do not contain fluorochemicals, polyethylene or wax the resulting paper products can be recycled and repulped.

10 Claims, No Drawings

METHODS FOR MANUFACTURING RECYCLABLE AND REPULPABLE PACKAGING MATERIALS

CROSS REFERENCE TO RELATED APPLICATIONS

This application claims the benefit of priority to U.S. Provisional Application No. 61/311,186, filed Mar. 5, 2010, the disclosure of which is incorporated here in its entirety.

BACKGROUND OF THE INVENTION

Paper products have a wide variety of applications for food applications. Paper, solid board and molded pulp can be engineered to create cups, plates, sandwich wraps, butcher paper, freezer wraps and food containers such as French fry holders and sandwich clamshells. In order for the paper products to perform for their intended applications, a barrier coating must be applied to guard against any potential permeability of water, oil, or grease from aqueous or non-aqueous sources. If moisture (liquid or vapour) permeates the paper, the paper loses its rigidity and its performance as a package decreases significantly. In addition, the moisture will cause a "cockling" of the paper, causing point-of-sale graphics to lose their appeal. If oil or grease comes in contact with the paper, it will cause staining on the packaging which is unappealing for two reasons: (1) the fat stains give the purchaser the impression that the food is not healthy because of its fat content; and (2) the package looks "dirty" and becomes difficult to sell.

Paper coatings are generally made from pigments, binders, film formers and various additives intended to achieve desired performance characteristics. In many instances the coating process is divided into two distinct steps: the application of a base coat and the application of a top coat. The base coat typically comprises chemical formulations that decrease the cellulosic substrate's porosity and may improve the adhesion of the subsequent topcoat. The top coat is generally formulated with the focus on the desired barrier properties of the specific application, for example, water, grease and/or oil resistance.

It is well known in the art to apply chemical formulations that include fluorochemicals, often containing chemicals such as perfluorooctanoic acid (PFOA), wax or polyethylene to cellulosic substrates to impart grease and oil resistance to the substrate. Although these chemical applications provide the application performance desired, they are subject to environmental and safety concerns. Specifically, the PFOA-containing materials include halogenated hydrocarbons that have been demonstrated to accumulate in fats of living beings and do not biodegrade readily. Examples of halogenated hydrocarbons include but are by no means limited to polychlorinated biphenyl (PCB), dichlorodiphenyltrichloroethane (DDT) and polyvinyl chloride (PVC). Waxes and polyethylene are hydrocarbon-based and, when laminated or extruded to packaging, make these materials non-recyclable. For polyethylene, this is because the polyethylene film does not easily separate from the substrate, causing clumps of materials to build up onto the pulp screen during the paper recycling process. For wax, the high temperatures that are used during the recycling process cause the wax to melt. The wax then deposits on parts of the machinery, causing a decrease in efficiency and resulting in spotting to the recycled paper, which often results in the recycled paper having to be sold as inferior quality. This inferior paper is often sold at a discounted of between 15%-20% from a premium quality recycled paper.

It is accepted in the art to coat paper and paperboard with wax and polymer coatings such as polyethylene, acrylic polymers, ethylene-vinyl acetate copolymers and conventional rubber type polymers such as styrene-butadiene polymers. These formulations provide coatings that are useful for providing resistance to water and oil and/or grease penetration to paper, paperboard and corrugated products. However, these products, are difficult to recycle and do not provide repulping characteristics required for reuse in the paper making process, as discussed above.

Therefore, the need exists for chemical formulations for paper coatings that are water, oil and/or grease resistant, and are environmentally friendly without possible health risks. Specifically, it would be quite useful for such formulations to be engineered for food applications such as wrappers, assorted packaging and containers where food contact is imminent.

SUMMARY OF THE INVENTION

Described herein are paper coatings and resultant materials that achieve the desired barrier properties of water, oil and grease resistance but are also recyclable and repulpable and do not pose any direct health concerns. As discussed above, with regard to fluorochemicals, there is the possibility of bioaccumulation in the fats of living beings, including humans. For example, a recent study of chemicals in human beings showed an accumulation of fluorochemicals. As fluorochemicals are not found in nature, the accumulation is assumed to be due to the manufacture and use of fluorochemicals over time. Consequently, one has to be careful of the chemicals that one uses in the preparation of materials for food packaging applications. In any instance in which there is often direct food contact, these materials have to have FDA non-objection status to make sure that nothing potentially harmful is introduced by these materials.

Polymeric formulations which contain aqueous dispersions of acrylic monomers and copolymers and polyethylene terephthalate resin are disclosed which are useful as a coating system or treatment for imparting water, oil and grease resistance to cellulosic substrates. The formulations do not contain any fluorochemicals, polyethylene or wax. Moreover, the formulations provide water, oil and grease resistance properties that are at least equivalent to, if not an improvement over, known coatings and treatments which contain polyethylene and/or wax for water, oil and grease resistance. These coatings can also be formulated to impart improved anti-wicking properties during the paper making process. These formulations can be introduced at the wet end prior to the take out wire. It was discovered during this process that the paper achieved a near 0% non-wicking benefit. Ultimately this decreases the amount of chemical requirements for the base coat and top coat based to achieve target application objectives over prior art coatings, thereby enhancing cost efficiency. As discussed herein, these formulations contain components that are permitted to come into direct contact with food products. Therefore, the formulations of the present invention are ideal for use as coatings for paper and paperboard, including paper packaging such as that utilized in food wrappers, food containers, food receptacles and the like. In addition, because these formulations do not contain fluorochemicals, polyethylene or wax, the resulting paper products can be recycled and repulped.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

The present invention relates to a formulation which provides water, oil and grease resistance, a process of preparing the formulation, a process for applying the formulation to cellulosic substrates, and resultant products which have been treated or otherwise prepared with the formulation to provide water, oil and grease resistant properties.

Over time, it has been learned that acrylics offer good printability, glue adhesion, good grease hold out and water resistance. Unfortunately, acrylic is tied to the petroleum index for pricing. This creates two problems: pricing volatility and cost as a stand alone product for coatings. It has also been discovered that because of their petroleum nature, acrylics can react in the recycling and repulping process. Protocols set forth by the Fibre Box Association reveal wax or formulated wax formulations clog the pulping screens and spot the material being processed. Attempts were made with various fillers including latexes and clays to reduce the acrylic ratio but resulted in compromised water and grease resistance.

A 100% PET modified water dispersed resin was then introduced to evaluate paper barrier performance. Again, the paper was lacking in printability, grease hold out and glue adhesion performance. Surprisingly, the water resistance gave us a higher hold out. The diminished printability and glue adhesion was a critical challenge and only simple printing with one and two colors graphics was possible and glue adhesion at the joint was not acceptable. Both the ink and glue would tend to fleck off the paper material. Again formulations were attempted incorporating various latexes and clays fillers in an attempt to find a balance that would provide the required performance. Low impact inks and other polymer glues were evaluated but it was determined that these were not economically feasible. At this time, it was hypothesized that a lower glass transition temperature would yield desired surface tension and plasticity on the coating.

It was decided to investigate if a formulated product with both an aqueous PET dispersion and acrylic latex together could yield desired product performance results and recyclable and repulpable characteristics. The proper ratio of blended materials for achieving printability, glue adhesion, water resistance, attractive cost model, recyclibilty, and repuplability was determined as discussed below, using a manufacturable grade solid board or paper that can run in existing equipment in the market space, for example, butcher wrap paper, sandwich wrap, meat trays, folding cartons, ice cream cups, butter boxes and the like. After a number of attempts to formulate the proper ratios of material a successful formulation schema was obtained and the desired outcome was achieved as discussed herein.

The formulation, which is based on a polyester resin, namely polyethylene terephthalate, can be used as a barrier coating to provide water, oil and grease resistance on paper, paperboard, and corrugated products. Polyethylene terephthalate (PET) is used in most plastic beverage bottles. The coatings described herein employ a modified PET that it is dispersible in water so that it can be applied using conventional coating equipment as discussed herein. A method for preparing such a water-dispersible PET is described in U.S. Pat. No. 4,977,191 which is incorporated herein by reference in its entirety, particularly the sections describing the preparation of the water-dispersible PET. See Example 1 herein. See also U.S. Pat. No. 5,858,551 and U.S. Pat. No. 5,958,601, the disclosures of which are incorporated herein by reference in their entirety. The modifications also affect the polymer properties such that it can be repulped when applied to paper packaging.

The coating formulation can also include an acrylic polymer, preferably a styrene acrylic, for use in embodiments of the invention where improved glue-ability and/or printability are needed. The acrylic polymer, preferably a styrene acrylic, is used because it reduces the glass transition temperature (Tg) of the resulting polymer blend, resulting in a coating that is printable and glue-able. The use of PET provides repulpability and recyclability to the combined polymers which is not achievable with the acrylic by itself. As discussed herein, in a preferred embodiment, the water-dispersible PET and the acrylic polymer are applied together.

In a preferred embodiment, the styrene acrylic is produced by polymerizing 77 to 83 parts by weight of styrene with 13 to 17 parts of methyl methacrylate, 3 to 4 parts of butyl methacrylate, 0.5 to 2.5 parts of methacrylic acid and 0.1 to 0.3 parts of butyl acrylate such that the finished copolymers have a minimum number average molecular weight greater than 100,000 and a level of residual styrene monomer in the polymer not to exceed 0.1 percent by weight.

It is of note that other suitable acrylic polymers may be used within the invention, for example but by no means limited to: acrylics and their copolymers; acrylamide with ethylacrylate and/or styrene and/or methacrylic acid; acrylic acid and the following esters thereof: ethyl, methyl, butyl; acrylate-styrene-methacrylic acid-hydroxyethyl methacrylate copolymers; butyl acrylate-styrene-methacrylic acid-hydroxypropyl methacrylate copolymers; ethyl acrylate-styrene-methacrylic acid copolymers; 2-Ethylhexyl acrylate-ethyl acrylate copolymers; 2-ethylhexyl acrylate-methyl methacrylate-acrylic acid copolymers; methacrylic acid and the following esters thereof: butyl, ethyl; methacrylic acid or its ethyl and methyl esters copolymerized with one or more of the following: acrylic acid, ethyl acrylate, methyl acrylate, n-butyl acrylate-styrene-methacrylic acid-hydroxyethyl methacrylate copolymers; styrene polymers made by the polymerization of any combination of styrene or alpha methyl styrene with acrylic acid, methacrylic acid, 2-ethyl hexyl acrylate, methyl methacrylate, and butyl acrylate; and elastomers such as butadiene-acrylonitrile copolymer, butadiene-acrylonitrile-styrene copolymer, and butadiene-styrene copolymer.

The modified PET provides the repulpability and recyclability and the incorporation of the acrylic provides improved glue-ability and printability when compared to the PET by itself, as discussed herein. The formulations and subsequent products do not contain fluorochemicals, wax, or polyethylene, which are common in the art for providing water, oil and grease resistant properties. The incorporation of the modified PET improves the recycling and repulping of the packaging when used as feedstock to produce recycled paper products, as discussed herein. Accordingly, it is noted that in all embodiments, the coating are entirely fluorochemical-free.

Also provided is a water, oil and grease resistant formulation comprising an aqueous dispersion of an acrylic monomer or copolymer and modified polyethylene terephthalate resin wherein the acrylic monomer or copolymer comprises 20 to 65 percent by weight and the modified polyethylene terephthalate resin comprises from about 35 to 80 percent by weight, based on the total weight of the formulation. Also provided is a water, oil and grease resistant formulation comprising an aqueous dispersion of a modified PET resin.

In a preferred embodiment of the invention where improved glue-ability and printability is desired, there is provided a water, oil and grease resistant formulation comprising of an aqueous dispersion of an acrylic monomer or copolymer and modified polyethylene terephthalate resin wherein said acrylic monomer or copolymer comprises 20 to 65 percent by weight of the active ingredients and polyethylene terephthalate resin comprises from about 35 to 80 percent by weight of the active ingredients, based on the total weight of said formulation. Ratios outside of this range in some embodiments will not have acceptable performance in water/grease/oil resistance, printability or glue-ability, or acceptable repulpability or recyclability. For example, it is noted that acrylic levels above 65% makes the coating unrecyclable and unrepulpable whereas acrylic levels below 20% produces a coating that is difficult to print on and/or to be glued. Specifically, higher levels of acrylic don't work because when the coating also includes modified PET, the level of PET is too small so that the resulting film does not break down during repulping and the film exhibits mainly the properties of the acrylic as discussed above.

As discussed herein, the PET/acrylic coating serves as the 'top coat'. In some embodiments, a base coat is applied to 'fill' or 'smooth' the cellulosic material. Typically, the base coat comprises a styrene-butadiene polymer binder and a modified PET, as discussed below. A typical basecoat of this invention would include a pigment or clay from 20% to 70% of the total dry weight of the final coating; it includes an styrene butadiene resin of from 80% to 30% of the total dry weight solids; a third component, if optionally present, would be a modified PET which would replace up to 20% of the dry pigment or styrene butadiene solids. The formulation may also include biocides, defoamers and other process aids at minimal levels as needed by the specific formulation.

In a preferred embodiment, the base coat is applied to the paper substrate first. A significant advantage to the method described herein is that the base coat can be applied in a manner that is consistent with current equipment. That is, the base coat can be applied in-line or on-machine, with a rod, blade, airknife coater, flexographic or gravure. If off-machine, the coating method could be any one used on-machine or any printing method such as a flexographic or gravure printer. The paper is coated at speeds that typically exist on the existing equipment; for a paper machine, the speed could be as fast as 2,000 feet per minute, or higher, such as 5-6,000 fpm; off-machine coaters operate at slower speeds. Waxes and formulated waxes cannot run in-line in the paper making process due to the clogging and build up that is created with these materials. Also, acrylic, styrene butadienes and wax cannot be cooled quickly enough to avoid creating paper logs. Paper machines do not have chill rollers in-line to lower the temperature of these waxes or formulated waxes to preferred levels prior to processing paper and a desired processing rate of 2,000 linear feet per minute is not achievable. With proper ratios of PET and acrylic latexes, the process can operate in-line at desired velocities and achieve production capacities required in the industry. The inventiveness of these formulations gives the paper mill flexibility for their in-line processes and eliminates the necessity for off-line and off-site post processing. This is economically attractive as off-Line coaters commonly run speeds from 500 linear feet per minute to 800 linear feet per minute sacrificing time, money and process efficiencies.

Resistance to oil/grease/water is dependent on forming a continuous film on the surface of the paper. In most instances, if the film is continuous, it will be an effective barrier to all three.

In another embodiment of the invention, there is provided a water, oil and grease resistant material comprising of a cellulosic substrate and an aqueous dispersion of an acrylic monomer or copolymer and polyethylene terephthalate resin wherein said acrylic monomer or copolymer comprises 20 to 65 percent by weight and said polyethylene terephthalate comprises from about 35 to 80 percent by weight, based on the total weight of said formulation.

The cellulosic substrate may be flexible paper, paperboard, corrugated paper, corrugated box or the like. Paper is coated with basecoat and then dried. It is of note that the temperature that the paper gets to in the drying process for the basecoat is not critical. A second coating (i.e., the topcoat) is applied and the paper is dried. The coated surface of the paper needs to be heated to at least 85 C, but, more preferably to 100-105° C. The paper then has to be cooled to <50-55° C. before it goes into the reel so that it does not block or stick together.

In some embodiments, articles are cooled to at least about 160° F. or lower, to reduce the tackiness of a cured modified polyethylene terephthalate.

The present invention also has flexible utility as it may be applied in-line on a paper machine or off-line at a paper converter. Typically, polyethylene is extruded or laminated onto a base sheet in a separate process from making the paper. More specifically, the paper is made on a paper machine and then the paper rolls are transferred to another location and are further processed with another piece of equipment which is used to apply the polyethylene. There are limited number of machines that can apply the polyethylene which results in increased costs and some delays in laminating the paper or board. Wax is also applied in a separate step, for example, after the corrugated box is formed. There are a limited number of converters who have waxing capability which in turn leads to higher costs. However, not all paper machines have the ability to apply coatings while the paper is being made and in those instances, the coatings will have to be applied off-machine. The formulations can be applied using a separate piece of equipment (as with waxes or polyethylene) or can be applied during the printing process of the package, if the converter has additional coating/printing stations to do that. In those instances where the products have to be applied off-line, the costs (including the costs of the coatings and applying the coatings) are less than the cost of polyethylene or wax and applying said coatings. The process for producing paper, paperboard, or corrugated products comprises the application of a base coat and a top coat with formulations as described herein and the components are based on a modified polyester resin, namely polyethylene terephthalate, and do not contain any fluorochemicals, wax or polyethylene.

The present invention relates to chemical formulations which provide water, oil and grease resistance when applied to a cellulosic substrate. The chemical components in the topcoat formulation do not contain polyethylene and are devoid of any wax and fluorochemicals of any nature. The effectiveness of the coating's performance results from the inclusion of a modified polyester resin, namely modified polyethylene terephthalate, in the said formulation. Modified PET dispersions are good film formers but in contrast to waxes and polyethylene (also good films or film formers), the modified PET-treated paper is repulpable and recyclable. Specifically, modified PET is broken down during the repulping process and is redeposited back onto the fiber, and the modified PET goes out with the new sheet of paper. Specifically, during the repulping process, water is heated and sometimes the pH is adjusted with base. The recycled paper or board is then added to the hot water and mixed. This causes the paper to "disintegrate" into individual fibers. The modified PET film also breaks down during this process into microscopic particles still attached to the individual fibers.

These fibers are then incorporated into the new sheet. The resulting sheet has the same properties as paper not treated with the PET-based coatings.

As discussed herein, the combination of modified PET and the acrylic modifies the Tg of the resulting film without destroying the continuity of the film, which in turn means that the coating is more easily printed upon and glued. Good printing and gluing depend on surface tension and plasticity of the film. The addition of the acrylic causes the film to soften (i.e., lower Tg) which makes gluing easier when using a hot melt adhesive. The acrylic also increases the surface tension such that ink and water-based adhesives can more easily wet the surface, thereby improving gluing and printing. Both of these properties are important for most food packaging. The function of the basecoat is to "plug" the holes in the paper; i.e., fill in the irregular surface of the paper, thereby reducing its absorptivity. As discussed above, the basecoat contains styrene-butadiene polymers along with pigment (clay) and a small amount of PET. It is of note that the PET in the basecoat is not the same PET as used in the topcoat. The basecoat PET is modified with a tall oil fatty acid rather than stearic acid, which is used to modify the PET used in the topcoat. The tall oil results in a modified PET with a higher surface energy. If the stearic acid modified PET is used, the surface energy of the basecoat is too low and the topcoat cannot coat the basecoat. That is, the topcoat does not wet out the basecoat, resulting in a non-continuous film. While a basecoat could be formulated without the PET, the presence of the PET improves the compatibility of the basecoat with the topcoat. As will be appreciated by one of skill in the art, this compatibility is important in certain embodiments because less topcoat is needed and it is easier for the topcoat to form a film.

While other basecoats may be used, the combination of the above-described basecoat and topcoat gives the desired performance. Lack of compatibility would affect the amount of topcoat used, resulting in a higher cost. The basecoat contains 35-40% on a dry basis of SB resin. The modified PET, from a practical perspective, allows such a high content to be repulpable because the modified PET deposits in with the SB resin, making a mixed modified PET/SB film. Under repulping conditions, the modified PET breaks down as described above. As a result, the SB is no longer continuous and will also break down and go out with the resulting recycled sheet. Typically, the critical properties one would measure are water/oil/grease resistance; however, the coating cannot degrade tear strength and/or bursting strength of the package, otherwise the package won't perform acceptably.

The present invention also relates to a process for preparing the chemical formulations and to the subsequent materials where the said formulation is applied. The performance of cellulosic substrates treated with said formulations are also described.

The formulation has a wide variety of uses and applications. It can be applied as a coating to cellulosic substrates such as paper, paperboard and corrugated materials to provide resistance to water, oil and grease and to provide release properties. Printability and glueability are not compromised as a result of the said chemical formulation application. In addition, recyclability and repulpability are improved over the existing art where barrier coatings are achieved through the application of a wax and polyethylene, vinyl, or rubber based polymer system.

In one embodiment the present invention involves paper sheets. The sheets can be made using standard papermaking techniques and chemistry. For the purpose of this invention, paper is defined as the product resulting from the assembly of cellulosic material, pulp, which is pressed and dried into sheets and is produced on conventional papermaking equipment. Examples of paper sheets that are encompassed in the present invention may include flexible paper packaging, corrugated board and/or folding cartons. The present invention includes paper derived from any of the common pulping processes, including mechanical, thermo-mechanical hybrid and chemical, bleached and unbleached paper, as well as recycled paper. Paper made by one of the variations of the kraft process is also included in the scope of the invention.

The generic methods for rod coating, rod-flexographic coating and gravure coating applications are outlined below.

Rod coating consists of one or more coating heads applying in sequence the base coat followed by drying followed by the top coat. Rod application of the base coat consists of an applicator roll which puts an excess amount of base coating on the surface of the web, immediately followed by a rod metering device that controls the precise amount of coating that remains on the surface of the sheet. Once the base coat is spread evenly on the moving web it enters a drying process that may include infra red heating, forced air drying or drying on the surface of a heated plenum or rotating drums. The top coating is applied in a second coating station in the same mechanical arrangement as the base coating followed by forced drying using infra red heating elements or forced air impingement drying. The drying of the top coat is done with sufficient temperature to ensure both drying and curing of the top coating to achieve the desired barrier properties. This step is usually controlled to a web temperature target for this purpose.

A combination of rod base coating may also be done with flexographic application of the top coating using a full coverage blanket image roller with an appropriately sized analox engrave roll to apply the wet coating to the image blanket. Drying of the top coating in this case is managed in the same fashion as done for Rod top coating.

Alternatively, gravure printing equipment can be used directly to apply coatings by using a fully engraved roll for transfer of the liquid coating. This can be done with differential speed rotation of the gravure roll or by synchronizing the speed of the roll with the moving paper web. Gravure printing/coating stations are arranged in such a way to first apply the desired amount of base coat in one or more applications followed by a top coating usually in a single application. Each coating station typically has drying arrangements or either infra red dryers or force air drying to assure the dryness of the base coat and the dryness and curing of the top coating.

The following discussion describes the present invention in the context of a water, oil and grease resistant coating to be applied onto cellulosic substrates such as paper, paperboard, and corrugated products. It is understood that the present invention may be modified accordingly for applications outside the limitations of coatings on cellulosic paper substrates. For example, the formulations described in this invention may be useful for applications on plastic sheets. It is also understood that the application range for this invention can be far broader than those mentioned relative to food and food packaging applications.

The formulations include an aqueous dispersion of modified polyethylene terephthalate dispersion and in those instances where improved glueability and/or printability is/are desired, an acrylic copolymer and modified polyethylene terephthalate. Both polymer dispersions, when applied to a cellulosic substrate, impart the desired water, oil and grease resistant properties. In addition, the resulting film from the modified PET and acrylic copolymer has a reduced Tg which makes it easier to glue and print upon. An example of an acrylic dispersion is ESI-CRYL 1454 available from CCP.

ESI-CRYL 1454 is an aqueous translucent emulsion that has been FDA approved for paper coatings per 21 CFR 175 subsections and 21CFR176 subsections. The modified polyethylene terephthalate component is supplied by Akzo Nobel as a solid resin and is subsequently converted into an aqueous dispersion for the purpose of formulation compatibility.

In addition to the polymer emulsions or dispersions, the present invention comprises additives to the final formulas which include, but are not limited to surfactants, defoamers, transfer agents, biocides, rheology modifiers, and pigments. These various materials are being added to improve processing of the coatings, extend the shelf life and to increase the efficiency of the coatings.

The application reach for which the formulation of the present invention is endless. One could envision a variety of uses in addition to the applications mentioned above such as ream wrap, grocery bags, pressure sensitive labels and label backing to name a few. For ream wrap, the coating would provide reduced moisture vapour permeability meaning that the paper packaged inside the ream wrap would not absorb moisture and therefore would maintain its dimensional stability and not cause jams when used in a copier or printer. For grocery bags, the coatings would keep the moisture from penetrating the paper, which would weaken the grocery bags, In many cases, grocery bags are unusable for carrying moist products (e.g., frozen or cold goods during the summer months where the moisture would condense on the package and that water would drip onto the paper bag causing it to lose its strength). For pressure sensitive labels, the coatings would provide release properties for the adhesives—the coating would be applied to the paper that is thrown away and that paper would be recyclable and repulpable. The current coating for pressure sensitive labels is a silicone, which is much more expensive than the products described herein and the silicone is not repulpable or recyclable. Much of the scope described here has been limited to food contact, but in no way should this be considered limiting as desirable applications exist within the industrial, medical, and construction markets.

While the formulations and applications of the chemical formulation have been discussed, it is to be understood that the manner in which the coating is applied can be varied. The process for applying the coating can be customized to fit a number of known application techniques including but not limited to spray bar coating, blade coaters, rod coaters, air knife coaters, and gravure coaters in a mill operation. The coating can also be applied by a converter using such techniques as rotogravure, flexographic, and other converting apparatus as well as blade coaters, rod coaters, or air knife coaters.

The following examples illustrate how the product can be manufactured and applied. The invention however is not necessarily limited by the examples.

Example 1

The formula for the aqueous dispersion of the polyethylene resin is 73.75% water, 25% solid polyethylene terephthalate resin, 1.25% ammonium hydroxide (26% solution). This formulation makes up a 25% solids product. It is of note that higher or lower solids products can be used but the coating conditions have to be changed so that the proper amount of dry materials is applied. The method used to make the aqueous polyethylene terephthalate resin is to first charge water to vessel, begin agitation, and heat to 80° C. When the water temperature reaches 80° C., add one-third of the ammonium hydroxide Immediately begin adding ground resin slowly, keeping the vessel temperature between 75 and 85° C. and the hot pH between 6.8 and 7.1. Typically, one would add one-third of the resin and then alternate between resin and ammonia with the resin lowering pH and the addition of ammonium hydroxide maintaining the pH within the specified range. After all of the resin has been added, maintain the vessel at a minimum of 85° C. until all of the resin is dissolved and pH is stable between 6.8 and 7.1. Stable pH is indicated by less than 0.1 pH unit change in two consecutive measurements taken two minutes apart. Once all the resin is dissolved and the pH at 25 C is 7.0 to 7.6 when measured in the lab, quickly cool the resin dispersion to 30° C.

Example 2

A dispersion system consisting of a basecoat formulation containing a 50% solids pigment/SB binder and modified polyethylene terephthalate dispersion base coat and a top coat formulation containing 25% acrylic/polyethylene terephthalate dispersion was applied to Kraft paper by a rotogravure coater. The application rate was 0.55 lbs. per thousand square feet for the base coat and 0.33 lbs. per thousand square feet for the top coat. The cure temperature for both the base coat and top coat was at least 205 degrees F. The resulting 2 minute Cobb value for the coated paper was 2 and there was a 0 mm wicking measurement.

Example 3

A wet end application was conducted on a #1 machine Vertiformer type 33# medium paper machine that was rated at 1650 feet per minute and 19.3 tons per hour. The paper comprised of 86% semi-chemical pine, 12% machine broke, and 2% old corrugate cardboard. Polyaluminum chloride (PAC) was added at a rate of 65 pounds per ton at the top of the machine chest and 6 dry pounds per ton of alkene ketene dimer (AKD) was added as a solution to the discharge of the machine chest. The charge profile prior to the PAC addition was −10,600 my and after an hour of PAC addition the charge profile had been reduced to −90 my. The aqueous polymer dispersion was added at a rate of 3,300 cc per minute to the semi-chemical side and 2,200 cc/min to the broke side. There was zero wicking from the paper produced when tested for 30 minutes after a 10 minute cure at 350 degrees F.

Example 4

Target for this trial is a 650 gsm multi-ply board with 8.5% final moisture content. The initial charge while the machine was being stabilized was −40 meq (Mutek) and a zeta potential of −9. 60 liters/hour of PAC was added to the system. After 30 minutes the charge decreased to the −20's; at that point it was decided to increase the PAC to 70 liters/hour to try to get the charge closer to −5 meq's; NVS 300WE at 90 liters/hour (~10 dry lbs per ton) and the AKD at 300 liters/hour (4 lbs/ton) were also added at this time.

Samples of board before the chemistry was added were taken; after 30 minutes, there was 32 mm of wicking. 30 minutes into the run, before the AKD had reached its desired level, another sample was tested; it had 28 min of wicking. About 30 minutes later another sample was taken; this had full load of all chemistry but the system was probably not completely stabilized. Off the machine, the 30 minute wicking was 2 mm for this sample. There was some edge creep above that level and when the 8 plies were delaminated by hand, one could see some moisture penetrating into the sheet. A sample of this board was cured for 15 minutes at 150° C. and then equilibrated for 30 additional minutes. This was done to accelerate the cure of the AKD to give an indication of the performance that can be expected after the AKD is fully cured. This sample had no wicking either on the face or along the edge.

Test Results

Following are a summary of the results on treated and untreated board:

Discussion of Results

Commercial board can be divided into three general categories: (1) recycled (either grey or brown), (2) virgin (bleached or natural) and (3) virgin with wet strength (e.g., beverage carrier board). The typical properties and property retention one might expect from the various qualities are as follows:

| Property | Recycled | Virgin | Virgin + wet strength |
|---|---|---|---|
| Cobb-2 min | >400 gsm | 50-60 gsm | 50-60 gsm |
| Stiffness at High RH | Poor | Retains <75% of the dry stiffness | Retains <75% of the dry stiffness |
| Wet Tear-1 hour soak | Poor | Poor | Retains 70% of dry tear |
| Edge-wicking | Poor | Poor to good; requires treatment for non-wicking | Poor to good; requires treatment for non-wicking |

If one compares the results from the trial to the description above, the Cobb values on the trial board are better than virgin board; edge-wicking would be significantly better. The wet tear results are significantly better in that the recycled board that was produced retained about 40% of the dry tear after soaking for one hour. The retention of stiffness at high relative humidity would we similar to that of virgin board. Thus this wet end treated solid board's performance is equivalent to a non-wet strength virgin board. Or, if one wanted to compete with recycled board, given the strength retention at high humidity, the mill might be able to use a lower basis weight or caliper board.

For a virgin board replacement, the physical strength of recycled board for similar weight or caliper is lower due to the shorter fiber length of the recycled furnish; a heavier or thicker recycled board would need to be used if the wet end recycled board is used in those applications. For an application that currently uses recycled paper, the better strength retention could allow the given construction to be made from a lighter weight or caliper board. This lower fiber content could improve the economics of the construction.

As shown in Table 1, the present invention is comprised of an aqueous dispersion of acrylic and polyethylene terephthalate. A typical recipe for desired barrier properties described in the invention includes dispersed polymers from 25% to 70% of the entire chemical formulation by weight. The following is an example of the physical properties of such a coating formulation where the combination of acrylic and polyethylene terephthalate properties impart a desired resistance to water, oil and grease properties when applied to a cellulosic substrate.

TABLE 1

Physical Properties:

| Type: | emulsion |
|---|---|
| State: | liquid |
| Color: | white |
| Dried film: | translucent |
| Solids: | 41% |

TABLE 1-continued

Physical Properties:

| Viscosity: | 9-11 seconds with a #3Zhan Cup |
|---|---|
| Storage life: | 12 months @ 75 F. |
| Calculated voc: | 0 G/L |
| Weight per gallon: | 9.4 pounds |
| Flash point: | N/A |
| Freeze/thaw stability: | stable |
| PH: | 8-9 |

As is shown in Table 2, the formulation of the present invention provides equal or improved water, oil and grease resistant properties when compared to a polyethylene based coating. The equal or improved product characteristics along with the equal or improved recyclability and repulpability are very useful for consumable paper products such as those used in the food packaging.

TABLE 2

Barrier Propertiesof Wax (highest or worst values) + PE based Coatings v. Present Invention (Example 2, and for Wicking, Example 3)

| | Performance Improvements | |
|---|---|---|
| | Wax + PE s Coating | Modified PET Based Coatings |
| Cobb (2 minutes) | 6 | 2 |
| Cobb (30 minutes) | 41 | 22 |
| Cobb (30 minutes after 30 second cure at 350 F.) | 22 | 12 |
| Oil Penetration | 4.6% | 2% |
| Wicking | Unknown | 0 mm |

As shown in Table 3, the fact that there is no wax or polyethylene in the coating substantially increases the repulpability and recyclability of the packaging.

TABLE 3

Recyclability and Repulpability of Acrylic + PE based Coatings (highest or worst values) v. Present Invention (Examples 2 and 3)

| | Recyclability/Repulpability | |
|---|---|---|
| | Typical Coatings | Modified PET Based Coatings |
| % Fiber Recovered | Typical 80-85% | 99.9%/100% |
| Pass Recyclability | Unknown | YES* |
| Basecoat per MSF | .6 lbs/.7 lbs | .5 lbs/.6 lbs |
| Top Coat per MSF | .5 lbs/.7 lbs | .3 lbs/.4 lbs |

*Recyclability and repulpability testing conducted at Western Michigan University using the modified Fibre Box Association Protocol for Flexible Paper OCC-E While the preferred embodiments of the invention have been described above, it will be recognized and understood that various modifications may be made therein, and the appended claims are intended to cover all such modifications which may fall within the spirit and scope of the invention.

The invention claimed is:

1. A method for preparing a water, oil and grease resistant cellulosic material comprising
    (a) preparing an aqueous dispersion of an acrylic monomer or copolymer and a water-dispersible polyethylene terephthalate (PET) resin wherein the dispersion comprises 35 to 80% water-dispersible PET resin by weight and 20 to 65% acrylic monomer or copolymer by weight;

(b) coating at least one surface of a cellulosic substrate with the dispersion;
(c) heating the coated cellulosic substrate to a temperature greater than 85° C.;
(d) cooling the heated cellulosic substrate to a temperature of at least 55° C. to prepare a water, oil and grease resistant cellulosic material.

2. The method of claim 1 wherein the cellulosic substrate is flexible paper.

3. The method of claim 1 wherein the cellulosic substrate is corrugated paper.

4. The method of claim 1 wherein the cellulosic substrate is a corrugated box.

5. The method of claim 1 wherein the cellulosic substrate is paperboard.

6. The method of claim 1 wherein the dispersion is applied to the at least one surface of the cellulosic substrate at 0.80 to 2.50 pounds per 1000 square feet.

7. The method of claim 1 wherein the water-dispersible PET resin is a cured or partially cured water-dispersible PET resin.

8. The method of claim 1 wherein the water-dispersible PET resin is prepared by modifying solid PET resin with ammonium hydroxide.

9. The method of claim 1 wherein the acrylic monomer or copolymer is a styrene acrylic.

10. The method of claim 1 wherein the dispersion is coated onto at least one surface of the cellulosic substrate by spraying the dispersion onto at least one surface of the cellulosic substrate.

* * * * *